(12) United States Patent
Steinmann

(10) Patent No.: US 6,321,830 B1
(45) Date of Patent: Nov. 27, 2001

(54) COOLING SYSTEM FOR A WORK MACHINE

(75) Inventor: Jeff A. Steinmann, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/461,913

(22) Filed: Dec. 15, 1999

(51) Int. Cl.$^7$ .................................. F01P 9/00; F28F 9/22
(52) U.S. Cl. ......................... 165/41; 165/51; 165/122; 165/145; 123/41.01; 123/41.65
(58) Field of Search ................ 165/51, 120, 121, 165/122, 124, 125, 126, 144, 145, 148, 41; 123/41.01, 41.17, 41.28, 41.29, 41.44, 41.48, 41.49, 41.52, 41.56, 41.58, 41.6, 41.63, 41.65, 41.79

(56) References Cited

U.S. PATENT DOCUMENTS

| | | | |
|---|---|---|---|
| 3,424,234 | * | 1/1969 | Laing .................................. 165/51 X |
| 3,642,062 | | 2/1972 | Edmaier et al. . |
| 3,800,866 | * | 4/1974 | Ireland et al. ...................... 165/51 X |
| 3,868,992 | * | 3/1975 | Getz et al. ............................. 165/51 |
| 3,921,603 | | 11/1975 | Bentz et al. . |
| 4,059,080 | | 11/1977 | Rudert . |
| 4,062,401 | | 12/1977 | Rudny et al. . |
| 4,066,047 | | 1/1978 | Vidakovic et al. . |
| 4,086,886 | | 5/1978 | Edmaier et al. . |
| 4,116,171 | | 9/1978 | Schulmeister et al. . |
| 4,120,271 | | 10/1978 | Edmaier . |
| 4,136,735 | | 1/1979 | Beck et al. . |
| 4,377,203 | | 3/1983 | Ejima . |
| 4,757,858 | | 7/1988 | Miller et al. . |
| 5,172,752 | * | 12/1992 | Goetz et al. ........................ 165/51 X |

FOREIGN PATENT DOCUMENTS 2 173 586 A * 10/1986 (GB) ....................................... 165/51

* cited by examiner

Primary Examiner—Ira S. Lazarus
Assistant Examiner—Ljiljana V. Ciric
(74) Attorney, Agent, or Firm—Liza J. Meyers

(57) ABSTRACT

An apparatus and method for cooling a work machine is disclosed. The apparatus has a fan element located inside an engine compartment of the work machine in a horizontal orientation. The fan element draws external air from above the work machine into the engine compartment. A deflector directs the air through a plurality of cooling cores which are radially spaced about the engine compartment and interspersed with a plurality of core spaces. The apparatus can be cleaned by spraying fluid from the outside through the plurality of cooling cores, causing any trapped debris to fall to the bottom of the engine compartment, where it can be removed through a cleanout.

13 Claims, 2 Drawing Sheets

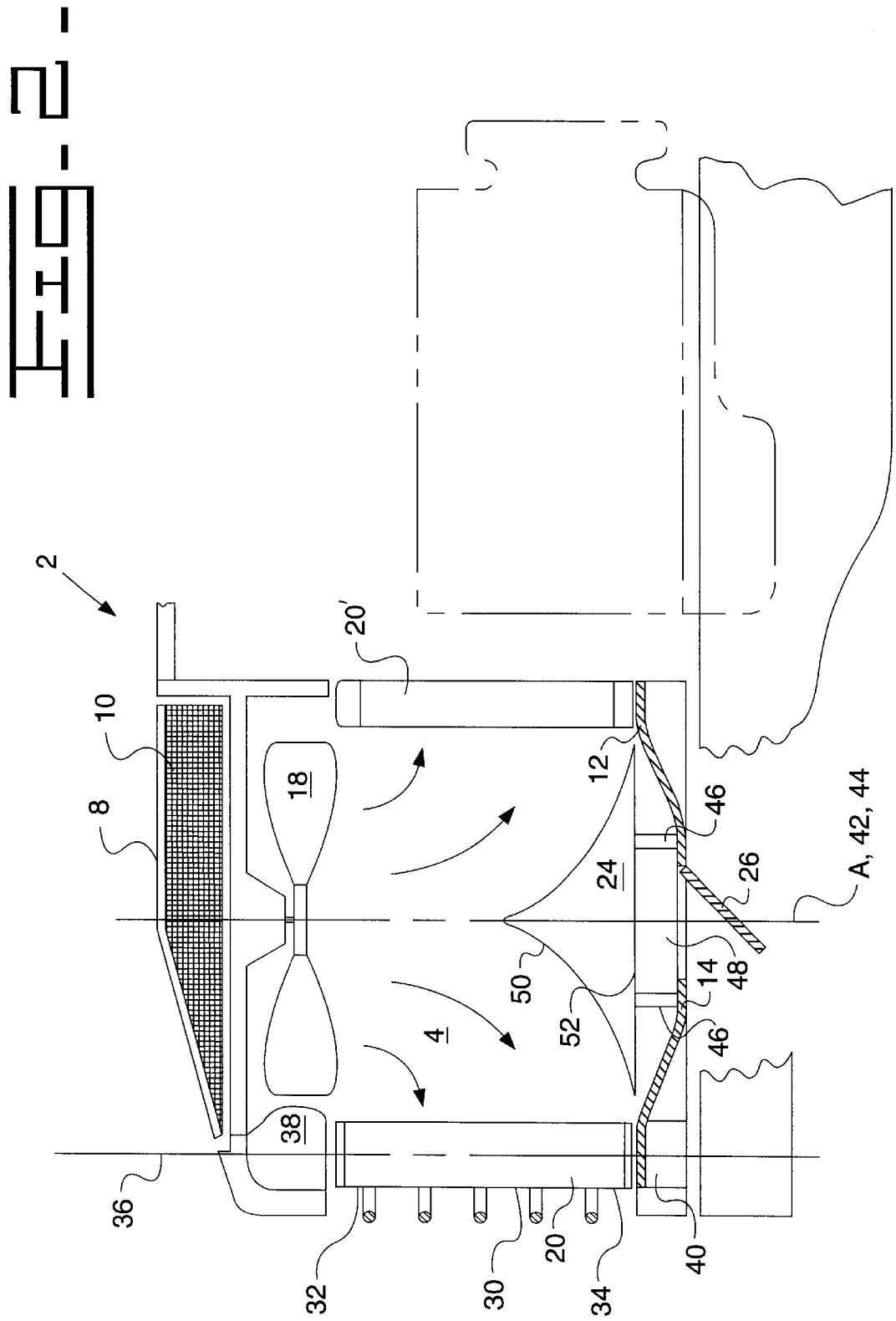

COOLING SYSTEM FOR A WORK MACHINE

TECHNICAL FIELD

The present invention relates generally to a system for cooling a work machine and more specifically to such a system used in landfill applications to provide for improved cooling and cleanability.

BACKGROUND ART

Work machines such as wheel loaders are commonly used in applications with debris-filled environments. The present invention is directed toward the use of such a work machine in a landfill application, but it is obvious that landscaping/mulching, agricultural, leaf composting, and many other applications would have similar environments. In an environment containing debris, especially large airborne particles, such as paper or leaves, difficulties arise in keeping the work machine's cooling system and radiators free of such debris. When the cooling system becomes clogged with this material, its efficiency drops and the machine may overheat.

Additional shielding and filters are sometimes used to keep debris from finding its way into the engine compartment, but this can mean that an insufficient volume of air is available for passing through the cooling cores.

Many attempts have been made to provide more efficient cooling systems for work machines. An example is shown in U.S. Pat. No. 4,377,203, issued Mar. 22, 1983 to Ejima. This patent discloses a centrifugal fan drawing air in through the front and back of the engine compartment and directing it out through a shaped radiator. This type of variable profile radiator can be very expensive to manufacture and drawing the air from two locations provides more of a chance for debris to enter the cooling system.

U.S. Pat. No. 4,757,858, issued Jul. 19, 1988 to Miller et al. discloses a cooling system mounted above the engine inside the engine compartment. Two fans are mounted horizontally into the top of the engine compartment, but draw air through rectangular radiators and out the top of the engine compartment. This design does not provide even airflow to all portions of the radiators and also draws airflow from a lower point on the machine toward a higher point.

Currently available work machines have cooling systems that are difficult to clean of debris that enters the system. The cleaning procedure often requires that the operator work in uncomfortable positions and may even require a time-consuming partial disassembly of the engine compartment of the machine. Due to the inconvenience of cleaning the cooling system, such preventative maintenance may be neglected, which can result in overheating and harm to the machine.

The present invention is directed to overcoming one or more of the problems as set forth above.

DISCLOSURE OF THE INVENTION

In one aspect of the present invention, an apparatus provides cooling air to the engine compartment of a work machine. A plurality of cooling cores are positioned about the circumference of the engine compartment. A plurality of core spaces provide separation between each of the plurality of cooling cores. An inlet header tank and an arcuate header tank are connected to the plurality of cooling cores. A fan is located inside the engine compartment near the tops of the plurality of cooling cores. A deflector is located inside the engine compartment near the bottoms of the plurality of cooling cores.

In another aspect of the present invention, an apparatus provides cooling air to the engine compartment of a work machine being used in a landfill application. A plurality of cooling cores are positioned about the circumference of the engine compartment. A plurality of core spaces provide separation between each of the plurality of cooling cores. An inlet header tank and an outlet header tank are connected to the plurality of cooling cores. A fan is located inside the engine compartment near the tops of the plurality of cooling cores. A deflector is located inside the engine compartment near the bottoms of the plurality of cooling cores.

In yet another aspect of the present invention, a method of cleaning a plurality of cooling cores in a cooling system for a work machine is disclosed. The method includes the steps of supplying an external fluid to the plurality of cooling cores and the plurality of core spaces, directing the fluid through the plurality of cooling cores and the plurality of core spaces, and spraying the external fluid under pressure through the plurality of cooling cores and the plurality of core spaces from a location outside the engine compartment.

BRIEF DESCRIPTION OF THE DRAWINGS

FIG. 2 is a sectional view of an embodiment of the present invention taken along line 2—2 of FIG. 1.

BEST MODE FOR CARRYING OUT THE INVENTION

Figure 1:
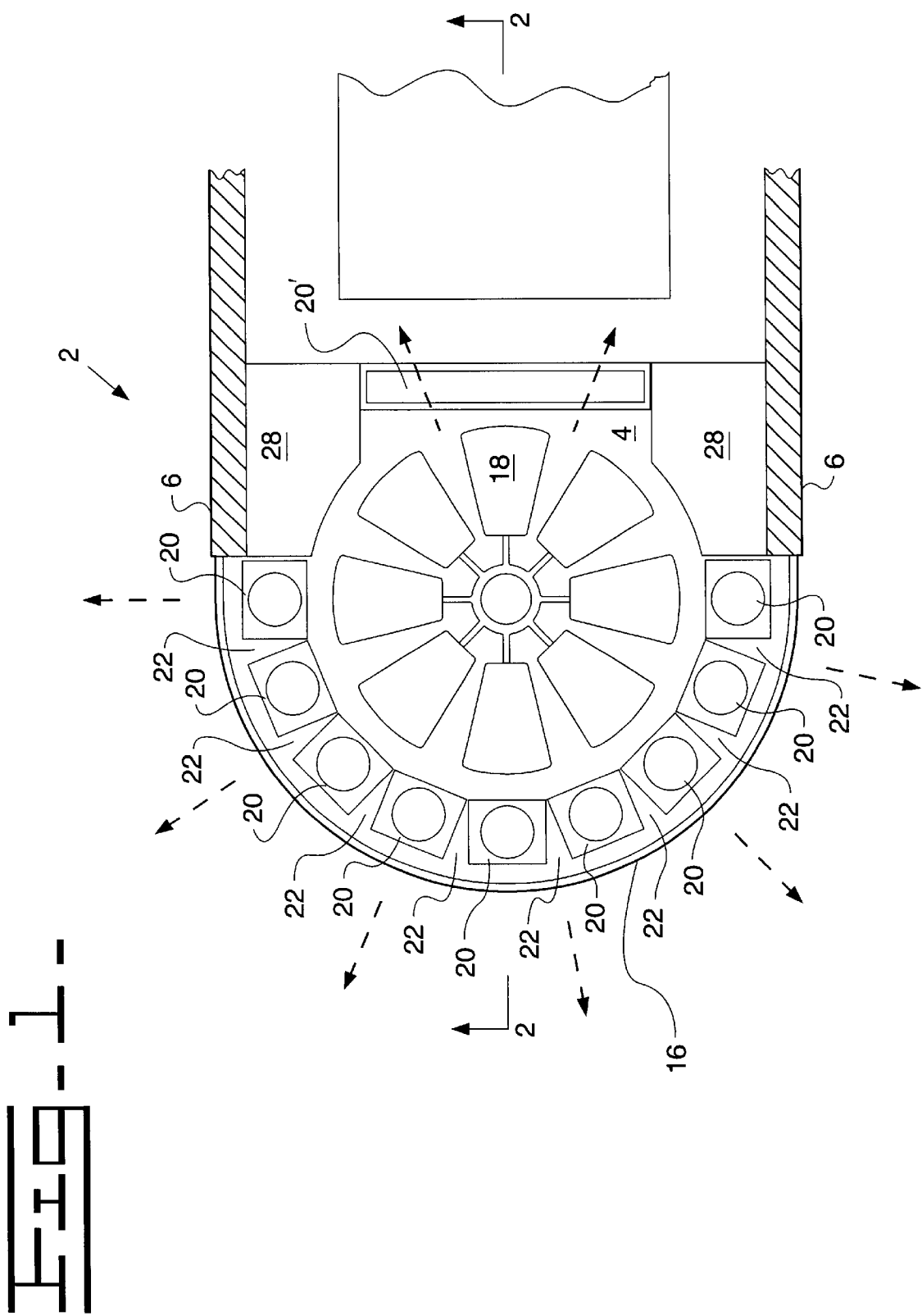
FIG. 1 is a plan view of an embodiment of the present invention.

Referring to FIGS. 1 and 2, an apparatus 2 provides cooling air to an engine compartment 4 of a work machine. In this application, the engine compartment is located at the rear of the work machine and is adjacent to the engine. It is an enclosure having two sides 6, a top 8 which contains a filtering screen 10, a bottom 12 which is slightly downsloped on all sides toward a bottom center portion 14, and a front 16. The front 16 has a curved cross-section, as can be seen in FIG. 1. The engine compartment 4 defines a central axis A which is located within the engine compartment 4 and extends in a vertical direction between the top 8 and the bottom 12.

The apparatus 2 has a fan element 18, a plurality of cooling cores 20, a plurality of core spaces 22 interspersed with the plurality of cooling cores 20, a deflector 24, and a cleanout 26. In addition, a plurality of baffles 28 may be placed in the engine compartment 4 to aid in directing the airflow through the plurality of cooling cores 20 and the plurality of core spaces 22.

Each of the plurality of cooling cores 20 has a central core portion 30, a top end portion 32, a bottom end portion 34, and a core axis 36 which extends between the top end portion 32 and the bottom end portion 34. Each core axis 36 is in an orientation substantially parallel to the central axis A. Each core axis 36 is located a predetermined distance from the central axis A to form a configuration of the plurality of cooling cores 20 along the circumference of the engine compartment 4. Preferably but not necessarily, this predetermined distance is equal for each of the plurality of cooling cores 20 and results in a radial arrangement of the plurality of cooling cores 20 about the central axis A. It is also possible for some of the plurality of cooling cores 20 to be located at a distance from the central axis A being of a different or unequal distance, shown by the plurality of cooling cores 20' in FIGS. 1 and 2. Additionally, the plurality of cooling cores 20 can be of differing configurations, also shown by the one of the plurality of cooling cores 20' in FIG. 1 and FIG. 2.

The plurality of cooling cores 20 is interconnected in the conventional manner but in a curved configuration via an inlet header tank 38 and an outlet header tank 40. The inlet header tank 38 and the outlet header tank 40 may be of an arcuate configuration. The plurality of cooling cores 20 could, as an alternative, have an individual inlet header tank 38 and in individual outlet header tank 40 attached by hoses similar to the attachment method used by the commonly used AMOCS cooling system. The shape of either of the arcuate header tanks need not be confined to that of a specific radius, but instead can be shaped to allow the plurality of cooling cores 20 to be arranged around the circumference of the engine compartment 4. For ease of reference, the plurality of cooling cores 20 will be discussed in the radial configuration described above, with each core axis 36 being a predetermined distance from the central axis A and the front 16 of the engine compartment 4 having a rounded contour, as shown in FIG. 1.

The plurality of core spaces 22 each have a configuration such that the cross section of each is generally wedge-shaped, having an apex chopped off to form a short side of the wedge located toward the inside of the engine compartment 4 and a pair of sides tapering outward toward a long side of the wedge located toward the outside of the engine compartment. This configuration is shown in FIG. 1. Alternately, the plurality of core spaces 22 may be each wholly or partially filled with one of a plurality of baffles 28 (not shown).

The fan element 18 is located adjacent the top end portions 32 of the plurality of cooling cores 20 and in a substantially horizontal position so as to direct external air down into the engine compartment 4. The fan element 18 is positioned just below the filtering screen 10 which is located in the top 8 of the engine compartment 4. The fan element 18 has a fan axis 42 which preferably, but not necessarily, is collinear with the central axis A. The fan element 18 is intended to be of the type commonly known as a bladed or propeller fan, but it is obvious to one skilled in the art that another configuration, such as a squirrel cage, impeller, or centrifugal fan could also produce a similar result.

The deflector 24 is located adjacent to the bottom end portions 34 of the plurality of cooling cores 20, in a position to deflect air from the fan element 18 radially outward and through the plurality of cooling cores 20. The deflector 24 is mounted at or near the bottom 12 of the engine compartment 4. The deflector 24 has a deflector axis 44 which preferably, but not necessarily, is collinear with the fan axis 42. The deflector 24 has at least one deflector leg 46 which serves to hold the deflector away from the bottom center portion 14 of the engine compartment 4 to form a cavity 48. The deflector 24 may have a structure as shown in FIG. 2, with a conical top 50 and a flat bottom 52, allowing a small spacing between the sloped sides of the bottom 12 of the engine compartment 4 and the deflector 24.

A cleanout 26 is located integrally with the bottom center portion 14 of the engine compartment 4 beneath the deflector 24, as can be seen in FIG. 2. The cleanout 26 can be opened to remove debris and the deflector 24 protects debris from being stirred up by air currents in the engine compartment 4.

INDUSTRIAL APPLICABILITY

In operation, the fan element 18 draws in external air through the top 8 of the engine compartment 4. The external air is directed by the deflector 24 to flow through the plurality of core spaces 22 and through the plurality of cooling cores 20. As the air passes through the plurality of cooling cores 20, it carries heat away from the plurality of cooling cores 20. Despite the presence of the filtering screen 10, some debris enters the engine compartment 4 with the air.

This debris is carried along with the air and either passes through the plurality of cooling cores 20 or the plurality of core spaces 22 or stays within the engine compartment 4. The plurality of core spaces 22 could carry debris with the flow of air rather than allowing the debris to plug or clog the plurality of cooling cores 20. Alternately, the plurality of core spaces 22 could be each wholly or partially filled with one of a plurality of baffles 28 to prevent air from taking a path of less resistance than through the plurality of cooling cores 20. Each of the plurality of core spaces 22 has a wedge-shaped cross-section which allows any debris which fits into the short side of the wedge to flow through the remaining, outward-tapering portion of the core space 22 unimpeded and to be discharged into the environment, thus keeping the plurality of core spaces 22 clear. The plurality of cooling cores 20 also act as a restriction on the velocity of the air flowing through the engine compartment 4, which encourages debris to flow with the higher velocity air through the plurality of core spaces 22. It should be noted that a large enough supply of air must be provided by the fan element 18 to both cool the plurality of cooling cores 20 and carry debris through the plurality of core spaces 22, which may necessitate the blocking of the plurality of core spaces 22 with a plurality of baffles 28 in some applications.

It is intended for debris that stays within the engine compartment 4 to fall to the bottom of the engine compartment 4 where it can be removed through the cleanout 26. However, some of the debris will be forced against the plurality of cooling cores 20 and will eventually clog the plurality of cooling cores 20.

As a part of the regularly scheduled maintenance or as needed, an operator can spray pressurized fluid through the plurality of cooling cores 20 from the outside of the engine compartment 4. This fluid, usually water, will dislodge the debris from the plurality of cooling cores 20 and cause it to fall to the bottom 12 of the engine compartment 4. Due to the structure of the bottom 12, the debris falls through the small spacing between the deflector 24 and the bottom 12 of the engine compartment 4 and onto the bottom center portion 14. The debris collects on top of the cleanout 26 underneath the deflector 24 within the cavity 48 where the debris can be removed by opening the cleanout 26 at the operator's convenience, preferably prior to spraying the pressurized fluid through the plurality of cooling cores 20 so that the fluid and debris can flow out of the cleanout 26 while the operator is performing the cleaning operation. The conical top 50 and flat bottom 52 of the deflector 24 act as a shield to keep the debris from being stirred up by the air inside the engine compartment 4 until such time as the debris is removed. This cleaning operation can be done as needed. In a dirty environment, the clogging of the plurality of cooling cores may necessitate cleaning several times a day in dirty environments. With the defined structure of the present invention, the operator is more likely to perform this maintenance because of the extreme ease and cleanliness of the cleaning procedure. Many prior art systems require that the operator access the inside of the engine compartment 4 for routine cleaning and spray from the inside to the outside, causing the operator to operate in a cramped area and even causing spray of the fluid and debris in the confined area back onto the operator. This is a very inconvenient and unpleasant task, which is eliminated by the present invention, thus keeping the operator dry and clean.

The present invention has several advantages over the prior art. The external air is drawn through the top of the engine compartment 4, which provides for the cleanest possible air to be brought into the apparatus 2 initially from the dirty working environment. Since the cooling system is easy to clean, it will almost certainly be cleaned more often than current systems, resulting in better machine efficiency as related to cooling, fuel economy, and machine longevity.

The curved cross-section of the front 16 of the engine compartment 4 will allow more cooling cores 20 to be positioned in the engine compartment 4 than would a rectangular profile of the same width and a traditional configuration. With the radial positioning of the plurality of cooling cores 20, there are no corners in which the air may stagnate. The air is directed from the fan element 18 radially an equal distance and velocity to each of the plurality of cooling cores 20, thus allowing equal cooling by each of the plurality of cooling cores 20 and eliminating hotter areas in the plurality of cooling cores 20. This radial arrangement also allows larger core spaces 22 between the plurality of cooling cores 20 as compared to the rectangular arrangement to further reduce clogging. The radial arrangement can also result in a reduction in height of the plurality of cooling cores 20 over the rectangularly arranged cores with the same cooling capacity, which leads to greater visibility for the operator.

Other aspects, objects, and advantages of this invention can be obtained from a study of the drawings, the disclosure, and the appended claims.

LIST OF ELEMENTS

TITLE: COOLING SYSTEM FOR A WORK MACHINE

FILE: 99-608

A central axis
2 apparatus
4 engine compartment
6 side
8 top
10 filtering screen
12 bottom
14 bottom center portion
16 front
18 fan element
20 plurality of cooling cores
20' plurality of cooling cores
22 plurality of core spaces
24 deflector
26 cleanout
28 baffles
30 central core portion
32 top end portion
34 bottom end portion
36 core axis
38 inlet header tank
40 outlet header tank
42 fan axis
44 deflector axis
46 deflector
48 cavity
50 conical top
52 flat bottom

What is claimed is:

1. An apparatus for providing air to a plurality of cooling cores of a work machine having an engine compartment, the apparatus comprising:

a central axis positioned in a vertical direction through and located inside the engine compartment;

each of the plurality of cooling cores having a central core portion, a top end portion, a bottom end portion, and a core axis extending between the top end portion and the bottom end portion, and being positioned about a circumference of the engine compartment of the work machine with the core axis parallel to and at a pre-defined distance from the central axis;

a plurality of core spaces being positioned about a circumference of the engine compartment and providing separation between each of the plurality of core elements;

an inlet header tank and an outlet header tank connected to the plurality of cooling cores;

a fan element having a fan axis and being positioned inside the engine compartment adjacent to the top end portions of the plurality of cooling cores; and a deflector having a deflector axis, the deflector axis being collinear with the fan axis, and being positioned inside the engine compartment near the bottom end portions of the plurality of cooling cores.

2. The apparatus as set forth in claim 1, wherein the fan element is chosen from the group consisting of a bladed fan, a propeller fan, a turbine fan, a centrifugal fan, and an axial fan.

3. The apparatus as set forth in claim 2, wherein the fan axis and the deflector axis each are collinear with the central axis.

4. The apparatus as set forth in claim 1, wherein the inlet header tank and the outlet header tank each have an arcuate configuration.

5. The apparatus as set forth in claim 1, wherein the plurality of cooling cores are each located radially from the central axis along a chord associated with a diameter centered about the central axis.

6. The apparatus as set forth in claim 1, wherein a cleanout is positioned near the bottom end portions of the plurality of cooling cores.

7. The apparatus as set forth in claim 1, wherein each of the plurality of core spaces is wholly or partially filled by a baffle.

8. An engine compartment of a work machine adapted for landfill operation and including an the apparatus comprising:

the engine compartment having a central axis positioned in a vertical direction through and located inside the engine compartment;

each of the plurality of cooling cores having a central core portion, a top end portion, a bottom end portion, and a core axis extending between the top end portion and the bottom end portion, and being positioned about a circumference of the engine compartment of the work machine with the core axis parallel to and at a pre-defined distance from the central axis;

a plurality of core spaces being positioned about a circumference of the engine compartment and providing separation between each of the plurality of cooling cores;

an inlet header tank and an outlet header tank connected to the plurality of cooling cores;

a fan element having a fan axis and being positioned inside the engine compartment adjacent to the top end portions of the plurality of cooling cores; and a deflector having a deflector axis, the deflector axis being collinear with the fan axis, and being positioned inside the engine compartment near the bottom end portions of the plurality of cooling cores.

9. The apparatus as set forth in claim 8, wherein the fan element is chosen from the group consisting of a bladed fan, a propeller fan, a turbine fan, a centrifugal fan, and an axial fan.

10. The apparatus as set forth in claim 9, wherein the fan axis and the deflector axis each are collinear with the central axis.

11. The apparatus as set forth in claim 8, wherein the inlet header tank and the outlet header tank each have an arcuate configuration.

12. The apparatus as set forth in claim 8, wherein a cleanout is positioned near the bottom end portions of the plurality of cooling cores.

13. The apparatus as set forth in claim 8, wherein each of the plurality of core spaces is wholly or partially filled by a baffle.

* * * * *

UNITED STATES PATENT AND TRADEMARK OFFICE
CERTIFICATE OF CORRECTION

PATENT NO.    : 6,321,830 B1
DATED         : November 27, 2001
INVENTOR(S)   : Jeff A. Steinmann It is certified that error appears in the above-identified patent and that said Letters Patent is hereby corrected as shown below:

<u>Column 6,</u>
Line 52, please delete the word "the".
Lines 51-52, corrected claim 8 should read as follows:
-- 8.  An engine compartment of a work machine adapted for landfill operation and including an apparatus comprising: --

Signed and Sealed this

Thirteenth Day of August, 2002

*Attest:*

*Attesting Officer*

JAMES E. ROGAN
*Director of the United States Patent and Trademark Office*